(12) United States Patent
Kim et al.

(10) Patent No.: US 9,313,451 B2
(45) Date of Patent: Apr. 12, 2016

(54) VIDEO COMMUNICATION METHOD AND ELECTRONIC DEVICE FOR PROCESSING METHOD THEREOF

(71) Applicant: Samsung Electronics Co., Ltd., Gyeonggi-do (KR)

(72) Inventors: Hyun-Kyoung Kim, Seoul (KR); Dae-Sung Kim, Seoul (KR); So-Ra Kim, Seoul (KR); Hang-Kyu Park, Seoul (KR); Seung-Kyung Lim, Seoul (KR)

(73) Assignee: Samsung Electronics, Co., Ltd, Suwon-si (KR)

( * ) Notice: Subject to any disclaimer, the term of this patent is extended or adjusted under 35 U.S.C. 154(b) by 82 days.

(21) Appl. No.: 14/148,442

(22) Filed: Jan. 6, 2014

(65) Prior Publication Data

US 2014/0192137 A1    Jul. 10, 2014

(30) Foreign Application Priority Data

Jan. 4, 2013 (KR) .................. 10-2013-0001023

(51) Int. Cl.
| | | |
|---|---|---|
| H04N 7/14 | (2006.01) | |
| H04M 1/725 | (2006.01) | |
| H04N 5/225 | (2006.01) | |
| H04N 5/272 | (2006.01) | |

(52) U.S. Cl.
CPC ........... *H04N 7/141* (2013.01); *H04M 1/72522* (2013.01); *H04N 5/2258* (2013.01); *H04N 5/272* (2013.01); *H04M 2250/52* (2013.01)

(58) Field of Classification Search
CPC ..... H04N 7/141; H04N 5/272; H04N 5/2258; H04M 1/72522; H04M 2259/52

USPC .......... 250/330; 348/14.02, 14.07, 14.08, 47, 348/218.1, 231.2, 231.3, 231.99, 33.04, 348/448, 333.04; 434/310; 235/454; 345/423; 386/224
See application file for complete search history.

(56) References Cited

U.S. PATENT DOCUMENTS

| | | | | |
|---|---|---|---|---|
| 5,175,616 | A * | 12/1992 | Milgram et al. ................. 348/47 |
| 6,731,282 | B2 * | 5/2004 | Stoll ......................... G06T 1/60 |
| | | | | 345/423 |
| 6,962,288 | B2 * | 11/2005 | Haba ................... H04N 1/00236 |
| | | | | 235/454 |
| 7,126,626 | B2 * | 10/2006 | Sawahara et al. ........... 348/14.02 |
| 7,381,952 | B2 * | 6/2008 | Teich et al. .................... 250/330 |
| 8,379,075 | B2 * | 2/2013 | Hagen ......................... 348/14.08 |
| 8,380,039 | B2 * | 2/2013 | Luo et al. ....................... 386/224 |
| 8,817,160 | B2 * | 8/2014 | Lee et al. .................. 348/333.04 |
| 2008/0084482 | A1 * | 4/2008 | Hansson et al. ............ 348/218.1 |
| 2008/0291323 | A1 * | 11/2008 | Higuchi et al. ............... 348/448 |
| 2011/0249078 | A1 | 10/2011 | Abuan et al. |
| 2012/0268552 | A1 * | 10/2012 | Choi et al. .................. 348/14.07 |
| 2012/0276513 | A1 * | 11/2012 | Ayers et al. ................... 434/310 |

(Continued)

FOREIGN PATENT DOCUMENTS

JP    2011-217121    10/2011

*Primary Examiner* — Gerald Gauthier

(57) ABSTRACT

A method and an apparatus for obtaining image data for video communication in an electronic device are provided. In an embodiment, a method and an apparatus for providing a video communication function that simultaneously uses image data obtained via a plurality of cameras. In the method, first image data is obtained using a first camera. Second image data is obtained using a second camera. The first image data is merged with the second image data. The merged image data is transmitted to a second electronic device. Other embodiments are possible.

20 Claims, 10 Drawing Sheets

(56) References Cited

U.S. PATENT DOCUMENTS

| | | | |
|---|---|---|---|
| 2013/0242057 A1* | 9/2013 | Hong et al. | 348/47 |
| 2014/0192137 A1* | 7/2014 | Kim et al. | 348/14.07 |
| 2014/0192229 A1* | 7/2014 | Kim et al. | 348/231.3 |
| 2014/0192232 A1* | 7/2014 | Park et al. | 348/231.99 |
| 2014/0354848 A1* | 12/2014 | Kim et al. | 348/231.2 |

* cited by examiner

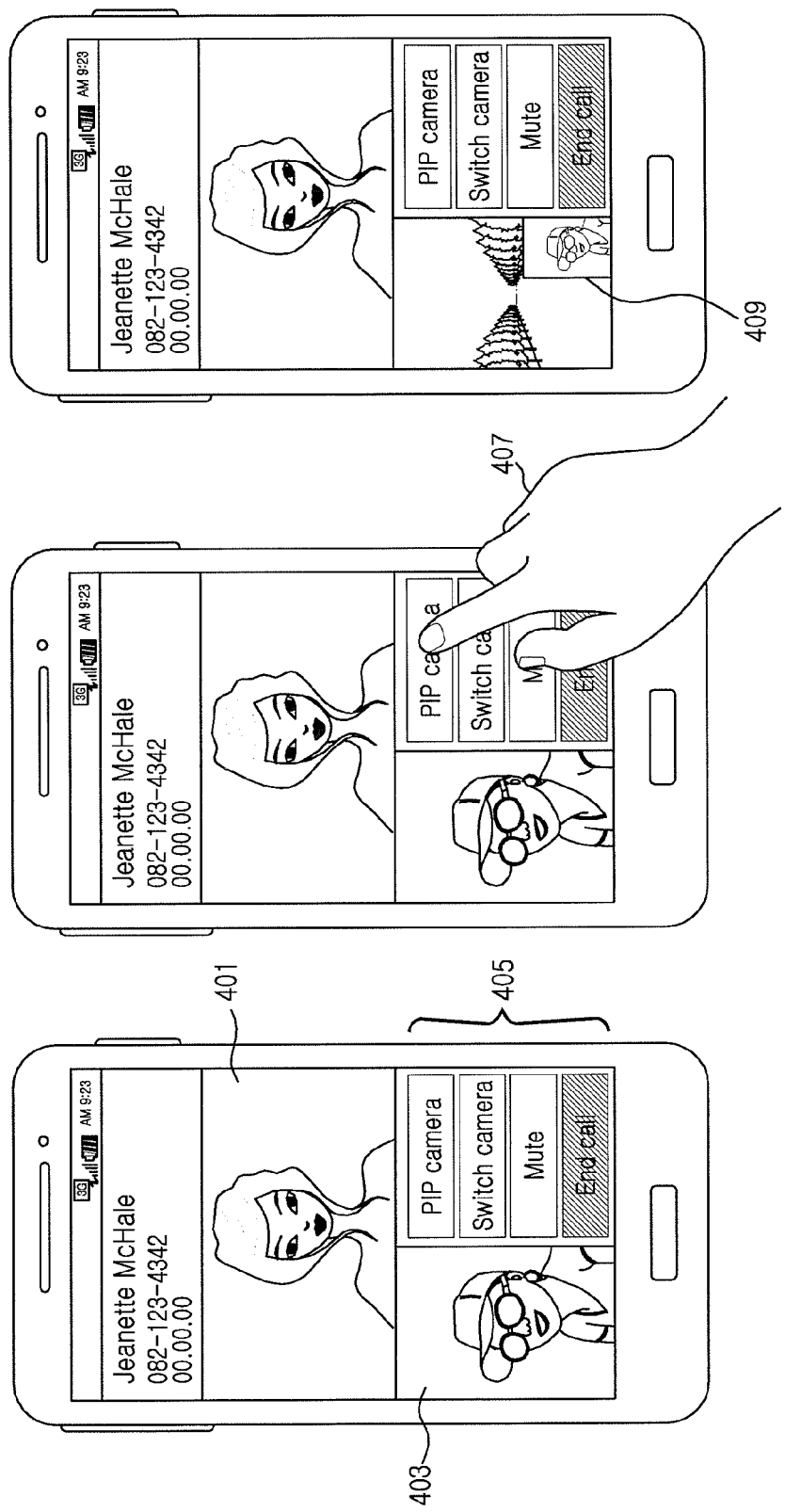

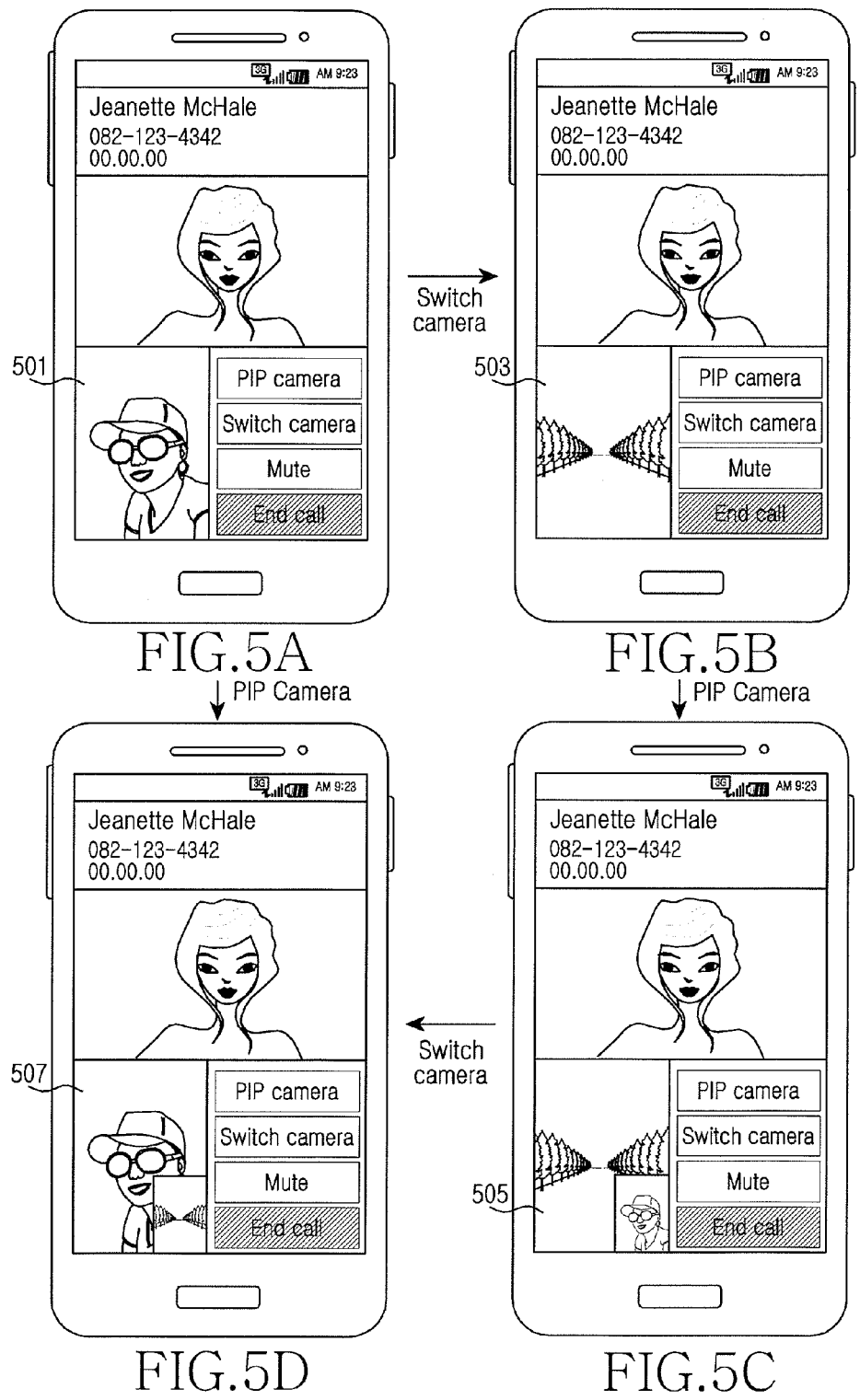

VIDEO COMMUNICATION METHOD AND ELECTRONIC DEVICE FOR PROCESSING METHOD THEREOF

PRIORITY

The present application is related to and claims the benefit under 35 U.S.C. §119(a) of a Korean patent application filed in the Korean Intellectual Property Office on Jan. 4, 2013 and assigned Serial No. 10-2013-0001023, the entire disclosure of which is hereby incorporated by reference.

TECHNICAL FIELD

The present disclosure relates to a method and an apparatus for obtaining image data for video communication in an electronic device.

BACKGROUND

Recently, as an electronic device develops rapidly, an electronic device enabling wireless voice communication and information exchange has become a daily necessity. In an early stage of distribution of the electronic device, the electronic device has been simply recognized as a terminal that may be carried with and enables wireless communication, but as a technology of the electronic device develops and a wireless Internet is introduced, the electronic device is not only used for the purpose of simple telephone communication and schedule management, but also expands its utilization range such as games, a remote controller using short distance communication, and capturing an image using a built-in camera, meeting a user's need.

Recently, an electronic device provides not only voice communication but also a video communication service allowing a user to perform communication while viewing a counterpart user's image.

As described above, as the electronic device provides a multimedia service, an amount of information to be processed and an amount of information to be displayed increase. Accordingly, an interest in an electronic device that includes a touchscreen, capable of increasing the size of a display unit by improving space utilization increases.

The touchscreen is an input and display unit performing input and display of information on one screen. Accordingly, when using the touchscreen, the electronic device may increase a display area by removing a separate input unit such as a keypad. For example, when using a full-touch display where the touchscreen is applied to an entire screen, the electronic device may utilize the entire surface of the electronic device as a screen to expand a screen size.

Such an electronic device may display image data on the expanded display unit to improve quality of a video communication service.

Generally, the electronic device disposes cameras in a front portion and a rear portion, respectively, and provides a video communication service shooting a user using the camera disposed in the front portion and shooting a background using the camera disposed in the rear portion.

In addition, the electronic device may select image data used for video communication via a camera switching menu. That is, the electronic device may perform video communication using image data obtained via one of the cameras disposed in the front portion and the rear portion.

This means image data obtained via a camera disposed in the rear portion and image data obtained via a camera disposed in the front portion cannot be provided to a counterpart user simultaneously, and only selective image data may be provided to the counterpart user via a camera switching menu.

A user that uses video communication desires to provide himself and a background to a counterpart user simultaneously during video communication but the user cannot provide image data regarding himself and the background to the counterpart user simultaneously due to the above limited function.

To solve the above problem, an apparatus and a method for providing a video communication function using image data simultaneously obtained via cameras disposed in the front portion and the rear portion of the electronic device are used.

SUMMARY

To address the above-discussed deficiencies, it is a primary object to provide an apparatus and a method for providing a video communication service using image data simultaneously obtained via a first camera and a second camera in an electronic device.

Another aspect of the present disclosure is to provide an apparatus and a method for merging image data obtained via a first camera and a second camera in an electronic device.

Still another aspect of the present disclosure is to provide an apparatus and a method for editing image data during video communication in an electronic device.

Yet another aspect of the present disclosure is to provide an apparatus and a method for displaying a transmission state of data transmitted to a counterpart user during a video communication in an electronic device.

In accordance with an aspect of the present disclosure, a video communication method of an electronic device includes obtaining first image data using a first camera, obtaining second image data using a second camera, merging the first image data with the second image data, and transmitting the merged image data to a second electronic device.

Merging the first image data with the second image data may include defining the first image data and the second image data as main image data and sub image data, determining a region where the sub image data is displayed on a portion of a display region of the main image data, and merging the sub image data in the determined region.

Merging the first image data with the second image data may include applying an editing effect corresponding to a user's gesture to at least one of the first image data and the second image data.

The editing effect may include at least one of size control, position change of a region where the sub image data is displayed, addition of text, and application of an animation effect to the image data.

Merging the first image data with the second image data may include, when a data transmission event occurs during video communication, adding information of transmitted data to one of the first image data and the second image data.

The method may further include receiving image data where first image data and second image data have merged from the second electronic device and displaying the same.

In accordance with another aspect of the present disclosure, an electronic device includes a display and at least one processor, wherein the processor obtains first image data using a first camera, obtains second image data using a second camera, merges the first image data with the second image data, and transmits the merged image data to a second electronic device.

The processor may include an instruction for defining the first image data and the second image data as main image data and sub image data, determining a region where the sub image data is displayed on a portion of a display region of the main image data, and merging the sub image data in the determined region.

The processor may process to apply an editing effect corresponding to a user's gesture to at least one of the first image data and the second image data.

The processor may process to apply at least one of editing effects including size control, position change of a region where the sub image data is displayed, addition of text, and application of an animation effect to the image data.

When a data transmission event occurs during video communication, the processor may process to add information of transmitted data to at least one of the first image data and the second image data.

The processor may process to receive image data where first image data and second image data have merged from the second electronic device and displays the same.

In accordance with still another aspect of the present disclosure, a computer readable storage medium storing one or more programs including instructions, when executed by an electronic device, for allowing the electronic device to obtain first image data using a first camera, obtain second image data using a second camera, merge the first image data with the second image data, and transmit the merged image data to a second electronic device.

Other aspects, advantages and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A, 4B and 4C illustrate views of a video communication process of an electronic device according to an example embodiment of the present disclosure;

FIGS. 5A, 5B, 5C and 5D illustrate views of a process for controlling video communication in an electronic device according to an example embodiment of the present disclosure;

Throughout the drawings, like reference numerals will be understood to refer to like parts, components and structures.

DETAILED DESCRIPTION

Figure 1:
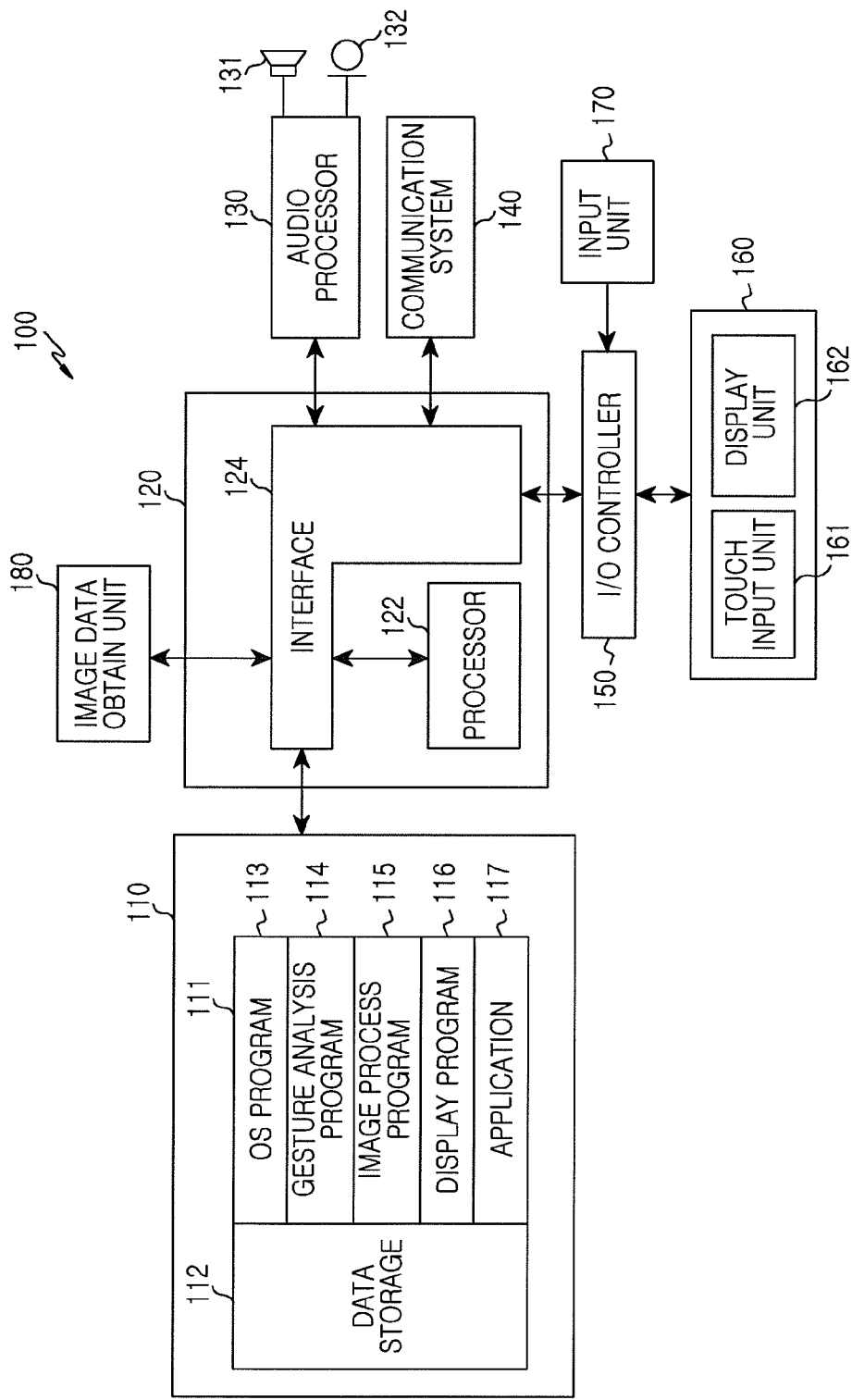
FIG. 1 illustrates a block diagram of an electronic device providing video communication according to the present disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of example embodiments of the disclosure as defined by the claims and their equivalents. The description includes various specific details to assist in that understanding but these are to be regarded as merely examples. Accordingly, those of ordinary skill in the art will recognize that various changes and modifications of the embodiments described herein may be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it may be apparent to those skilled in the art that the following description of example embodiments of the present disclosure are provided for illustration purpose only and not for the purpose of limiting the disclosure as defined by the appended claims and their equivalents.

The present disclosure relates to a method and an apparatus for providing a video communication function that uses image data obtained via a plurality of cameras. Hereinafter, description is made on technology for using image data obtained via both a first camera and a second camera for video communication in an electronic device.

The first camera and the second camera of the electronic device are disposed in different directions, respectively, to shoot image data (main image data and sub image data) corresponding to each direction. For example, the first camera may be disposed in the front portion of the electronic device to obtain image data regarding a user's figure, and the second camera may be disposed in the rear portion of the electronic device to obtain image data regarding a background.

Also, according to the present specification, a gesture denotes forming a touch pattern on a touchscreen of the electronic device. A touch is performed on the touchscreen of the electronic device by an external input means such as a user's finger or a stylus pen, and the like, and the gesture denotes a drag of a predetermined pattern is performed with a touch maintained on the touchscreen. Depending on examples, a gesture may denote a drag and a release of a touch are performed with the touch maintained.

In addition, the electronic device may be a portable electronic device, and may be a portable terminal, a mobile phone, a media player, a tablet computer, a handheld computer, or a Personal Digital Assistant (PDA). Also, the electronic device may be an arbitrary electronic device including a device combining two or more functions among these devices.

FIG. 1 illustrates a block diagram of an electronic device providing video communication according to the present disclosure.

As illustrated in FIG. 1, the electronic device 100 may include a memory 110, a processor unit 120, an audio processor 130, a communication system 140, an Input/Output (I/O) controller 150, a touchscreen 160, and an input unit 170. Here, at least one of the above-mentioned elements may be the plural. For example, the electronic device 100 may include a plurality of memories or a plurality of communication systems.

The memory 110 may include a program storage 111 for storing a program for controlling an operation of the electronic device 100 and a data storage 112 for storing data generated during execution of a program. For example, the data storage 112 stores various updatable data for storage such as a phonebook, calling messages, and received messages. According to the present disclosure, the data storage 112 stores information of a position and a size where image data is displayed. Here, the image data denotes main image data and sub image data obtained via a first camera and a second camera. The sub image data may merge in a portion of the main image data. At this point, the position and size where the image data is displayed may be the position and the size of sub image data merging with the main image data.

Also, the program storage 111 may include an Operating System (OS) program 113, a gesture analysis program 114, an image process program 115, a display program 116, and at least one application 117. Here, a program included in the program storage 111 is a set of instructions and may be expressed as an instruction set.

The OS program 113 may include various software elements for controlling a general system operation. The control of this general system operation denotes, for example, memory management and control, storage hardware (device) control and management, power management and control, and the like. The OS program 113 performs a function for swift communication between various hardware (devices) and program elements (modules).

The gesture analysis program 114 analyzes a user's gesture for controlling the electronic device. Here, analyzing the user's gesture may be the same as detecting the user's gesture.

For example, the gesture analysis program 114 may detect the user's gesture for selecting image data to be provided to a counterpart user during video communication. The gesture analysis program 114 may detect the user's gesture performing video communication using main image data obtained via the first camera or the user's gesture performing video communication using sub image data obtained via the second camera during video communication.

The gesture analysis program 114 may detect the user's gesture transmitting main image data and sub image data simultaneously to a counterpart user during video communication.

The gesture analysis program 114 may detect the user's gesture transmitting data to a counterpart user during video communication.

The gesture analysis program 114 may detect the user's gesture editing image data transmitted to a counterpart user during video communication.

The gesture analysis program 114 may transfer the user's detected gesture to the image process program 115 and the display program 116.

When detecting the user's gesture transmitting main image data and sub image data simultaneously to a counterpart user, the image process program 115 may process to merge the main image data with the sub image data.

Merging the main image data with the sub image data denotes performing an image process such that the main image data and the sub image data are displayed simultaneously, and may be incorporating the sub image data to a portion of a region of the main image data.

When detecting the user's gesture editing image data transmitted to a counterpart user during video communication, the image process program 115 may process to apply an editing effect to the main image data or the sub image data.

The image process program 115 may control the position or size of a region where main image data or sub image data selected by the user is displayed.

The image process program 115 may apply text, an animation effect, and the like, to the main image data or sub image data selected by the user.

When detecting the user's gesture transmitting data to a counterpart user during video communication, the image process program 115 may incorporate a transmission state of data transmitted to the counterpart user to the main image data or the sub image data.

The image data image-processed by the image process program 115 may be transmitted to a second electronic device which is a video communication counterpart.

The display program 116 may include various software programs for providing and displaying graphics on the touchscreen 160. A terminology of graphics is used as meaning including text, a web page, an icon, a digital image, a video, an animation, and the like.

In addition, the display program 116 may include various software elements related to a user interface.

According to an embodiment, when detecting the user's gesture transmitting main image data and sub image data simultaneously to a counterpart user during video communication, the display program 116 may display image data where the main image data and the sub image data have merged.

When detecting the user's gesture editing image data transmitted to a counterpart user during video communication, the display program 116 may display image data where the position or size of a displayed region has changed or display image data to which text and an animation effect have been applied.

When detecting the user's gesture transmitting data to a counterpart user during video communication, the display program 116 may display image data including a transmission state of data.

The application 117 may include a software element regarding at least one application installed in the electronic device 100.

A program included in the program storage 111 may be allowed to operate via hardware configuration. According to an embodiment, the electronic device 100 may include a gesture analysis module, an image process module, a display module, and the like.

The processor module 120 may include at least one processor 122 and an interface 124. Here, the processor 122 and the interface 124 may be integrated in at least one integrated circuit or implemented as separate elements.

The interface 124 performs a role of a memory interface controlling an access of the processor 122 and the memory 110.

In addition, the interface 124 performs a role of a peripheral interface for controlling connection between I/O peripherals of the electronic device 100 and the processor 122.

The processor 122 may control the electronic device 100 to perform a video communication function that simultaneously uses main image data and sub image data using at least one software program. At this point, the processor 122 may execute at least one program stored in the memory 110 to perform a function corresponding to a relevant program. For example, the processor 122 may include a graphics processor for merging main image data and sub image data according to the user's gesture.

The graphics processor may apply an editing effect to image data or add a data transmission state to image data.

According to an embodiment, the video communication function of the electronic device 100 may be performed by software such as a program stored in the memory 110 or hardware such as a graphics processor.

The audio processor 130 may provide an audio interface between the user and the electronic device 100 via a speaker 131 and a microphone 132.

The communication system 140 performs a communication function for voice communication and data communication of the electronic device 100. At this point, the communication system 140 may be divided into a plurality of communication sub modules supporting different communication networks. For example, though not limited thereto, a communication network may include a Global System for Mobile Communication (GSM) network, an Enhanced Data GSM Environment (EDGE) network, a Code Division Multiple Access (CDMA) network, a Wide (W)-CDMA network, a Long Term Evolution (LIE) network, an Orthogonal Frequency Division Multiple Access (OFDMA) network, a wireless LAN, a Bluetooth network, and Near Field Communication (NFC), and the like.

The I/O controller 150 may provide an interface between an I/O unit such as the touchscreen 160 and the input unit 170, and the interface 124.

The touchscreen 160 is an I/O unit for performing output of information and input of information, and may include a touch input unit 161 and a display unit 162.

The touch input unit 161 may provide touch information detected via a touch panel to the processor unit 120 via the I/O controller 150. The touch input unit 161 changes touch information to an instruction structure such as touch_down, touch_move, and touch_up, and provides the same to the processor unit 120. According to the present disclosure, the touch input unit 161 generates the user's gesture for controlling video communication. Here, controlling the video communication may be performing video communication using main image data and sub image data simultaneously, transmitting data to a counterpart user, and editing image data to transmit to a counterpart user.

The display unit 162 displays state information of the electronic device 100, a character input by the user, moving pictures, still pictures, and the like. For example, the display unit 162 may display image data where image data obtained via the first camera and the second camera have merged, and display a video communication process that uses the merged image data.

The display unit 162 may display image data edited by the user and a transmission state of data transmitted to a counterpart user during video communication.

The input unit 170 may provide input data generated by the user's selection to the processor unit 120 via the I/O controller 150. For example, the input unit 170 may include a control button for controlling the electronic device 100. For another example, the input unit 170 may be configured using a keypad for receiving input data from the user to generate input data for controlling video communication according to the present disclosure.

Also, an image data obtain unit 180 is a module for obtaining image data, and may include at least two cameras. For example, the image data obtain unit 180 may include a first camera for obtaining main image data and a second camera for obtaining sub image data. These cameras may be disposed in different directions, respectively, and shoot image data corresponding to relevant directions. According to an embodiment, the first camera may be disposed in the front portion of the electronic device to obtain image data regarding the user's figure, and the second camera may be disposed in the rear portion of the electronic device to obtain image data regarding a background.

Though not shown, the electronic device 100 may include elements for providing additional functions such as a broadcasting reception module for receiving broadcasting, a digital sound source reproduce module such as an MP3 module, a short distance wireless communication module for short distance wireless communication, a proximity sensor module for proximity sensing, and the like, and software for operations of these.

Figure 2:
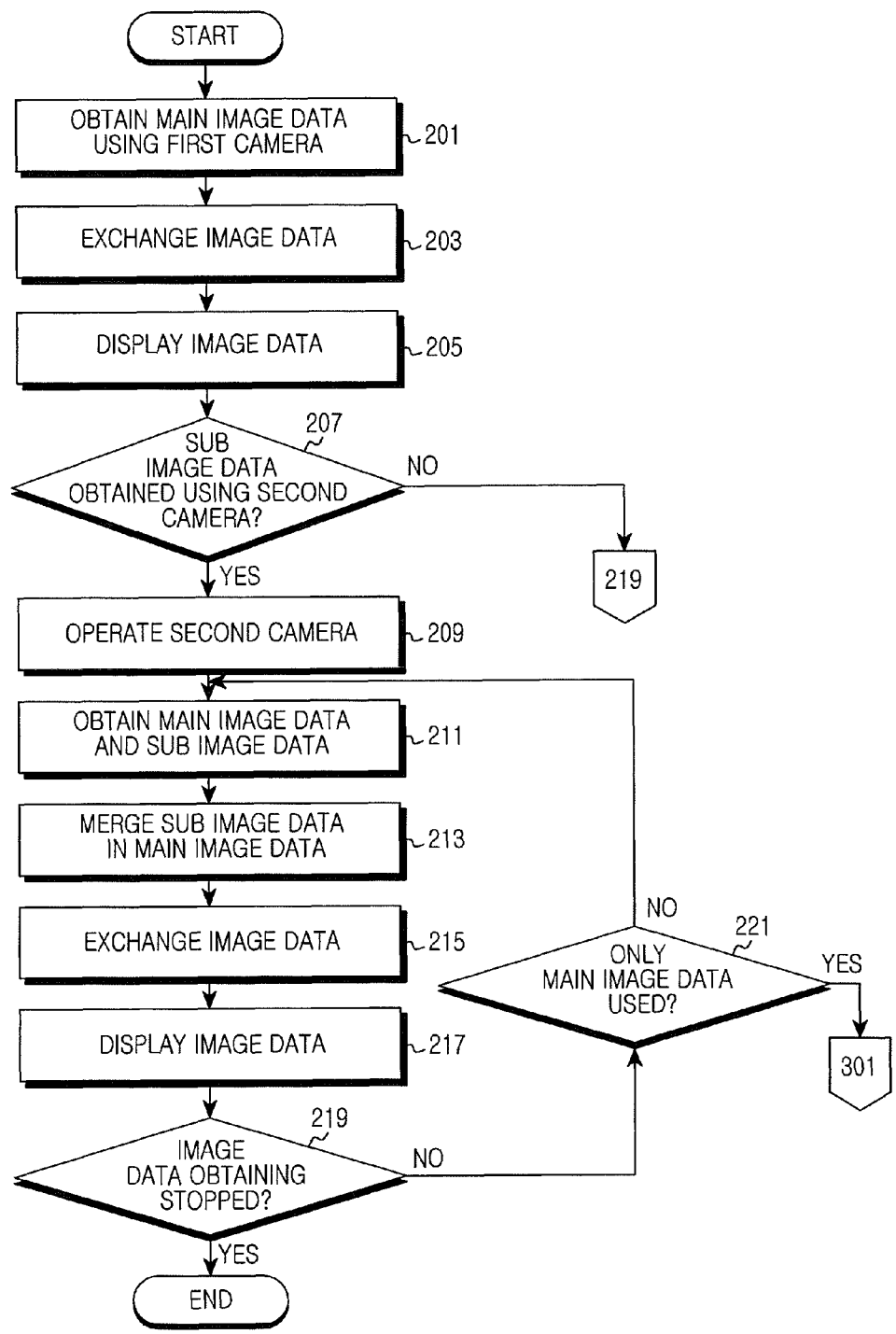
FIG. 2 illustrates a process of a process for performing video communication in an electronic device according to the present disclosure.

FIG. 2 illustrates a process of a process for performing video communication in an electronic device according to the present disclosure.

Referring to FIG. 2, the electronic device obtains image data using at least two cameras that includes different shooting directions. According to an embodiment of the present disclosure, the cameras may be disposed in the front portion and the rear portion to obtain image data regarding the front portion and image data regarding the rear portion with respect to the electronic device.

The electronic device may obtain main image data using a first camera in block 201. Here, the electronic device obtains image data using a camera disposed in the front portion or a camera disposed in the rear portion. Generally, the electronic device selects the camera of the front portion or the camera of the rear portion to provide image data obtained via the selected camera to the second electronic device. The image data provided to the second electronic device may be defined as main image data.

After that, the electronic device may proceed to block 203 to process to exchange the obtained image data with the second electronic device (the electronic device of a counterpart user), and then proceed to block 205 to perform a process for displaying image data. At this point, the electronic device may simultaneously display image data obtained using the first camera and image data received from the second electronic device.

For example, the electronic device may divide a display region to a first display region and a second display region, and then display the image data obtained via the first camera on the first display region, and display the image data received from the second electronic device on the second display region, simultaneously.

The electronic device may additionally divide the display region to a third display region to display a menu for controlling video communication on the third display region. The menu for controlling the video communication may include at least one of a menu for switching main image data, a menu for simultaneously displaying main image data and sub image data, a menu for controlling a volume of video communication, and a menu for ending video communication.

The menu for switching the main image data is a menu for selecting an operation of the camera disposed in the front portion or the camera disposed in the rear portion. The user may select the menu to selectively operate the camera disposed in the front portion or the camera disposed in the rear portion.

The menu for simultaneously displaying the main image data and the sub image data denotes a menu for performing video communication that uses main image data and sub image data simultaneously, and the menu for controlling the volume of video communication may be a menu for controlling the user's voice such that the user's voice may not be transferred to a counterpart user, or controlling the voice such that the volume of video communication may not be output.

The menus for controlling the display region and the video communication have been mentioned as an embodiment of the present disclosure. This menu configuration may change depending on a business or user's selection.

Blocks 201 to 205 may be a process for performing video communication with a counterpart user using image data obtained via one camera selected by the user.

The electronic device performing this operation may proceed to block 207 to determine whether an event for obtaining sub image data occurs using the second camera.

Here, the sub image data is image data obtained via another camera besides a camera obtaining main image data. Block 207 may be a process for determining whether to perform video communication that uses main image data and sub image data simultaneously.

Using the main image data and the sub image data simultaneously allows a background image obtained via a camera disposed in the rear portion and an image obtained via a camera disposed in the front portion to be displayed on the second electronic device. The electronic device may merge the two obtained images to provide the same to the second electronic device. For example, the electronic device allows a background and a user's face to be transmitted simultaneously to the second electronic device.

Though the present disclosure defines image data obtained via the first camera as main image data, and defines image data obtained via the second camera as sub image data, the main image data and the sub image data may be switched depending on a user's selection. That is, a background image may be main image data or sub image data depending on the user's selection.

In an embodiment, where an event for obtaining sub image data using the second camera does not occur in block 207, the electronic device may proceed to block 219 to determine whether image data obtaining ends. According to an embodiment, where video communication ends and obtaining image data is not needed in block 219, the electronic device may end the algorithm of the present disclosure or perform in a process for performing video communication using main image data.

In an embodiment, where an event for obtaining sub image data using the second camera occurs in block 207 (in other words, when performing video communication that uses main image data and sub image data simultaneously), the electronic device may proceed to block 209 to operate the second camera, and then proceed to block 211 to obtain sub image data via the second camera while obtaining main image data via the first camera.

After that, the electronic device may proceed to block 213 to process to merge main image data with sub image data. At this point, the electronic device may define a region where sub image data may merge in main image data, and allow the sub image data to merge in the defined region. Of course, the size and position of the region defined in advance may be changed by the user's gesture.

At this point, the electronic device may calculate a position and a size where sub image data is disposed every frame of obtained image data when the sub image data is obtained, and then merge sub image data in main image data such that the sub image data is suitable for the calculated position and size.

The reason of calculating the position and size where the sub image data is disposed every frame is for allowing the position and size of the sub image data displayed by the user's gesture to change smoothly.

According to an embodiment, when performing video communication that uses image data (main image data) obtained via one camera, the electronic device may display the image data on a position and in a size determined in advance. When performing video communication that uses main image data and sub image data simultaneously, the electronic device may calculate a position and a size where sub image data is disposed every frame of the sub image data.

The electronic device that merges main image data and sub image data as described above proceeds to block 215 to transmit the merged image data to the second electronic device, and receive image data from the second electronic device, and then proceeds to block 217 to display image data. At this point, the electronic device may simultaneously display image data (main image data and sub image data) obtained via the first camera and the second camera, and image data received from the second electronic device.

For example, the electronic device may display image data obtained via the first camera and the second camera on a first display region of a display region, and simultaneously display image data received from the second electronic device on a second display region.

When receiving image data where main image data and sub image data have merged from the second electronic device, the electronic device may display the image data merged by the second electronic device on the second display region.

This may be a situation where the user of the electronic device performs video communication while viewing a counterpart user's face and a background simultaneously.

After that, the electronic device proceeds to block 219 to determine whether obtaining image data is stopped. That is, the electronic device may determine whether the user's gesture for ending video communication is detected in block 219.

When determining the obtaining of the image data is not stopped in block 219, the electronic device may proceed to block 221 to determine whether to perform video communication using main image data.

When performing video communication using main image data in block 221, the electronic device may stop an operation of the second camera, and then proceed to block 201 to perform a process for obtaining image data using the first camera.

When maintaining video communication that uses main image data and sub image data in block 221, the electronic device may proceed to block 211 to perform a process for obtaining main image data and sub image data using the first camera and the second camera.

When determining the obtaining of the image data is stopped in block 219, the electronic device ends the algorithm of the present disclosure by ending a video communication function.

Figure 3:
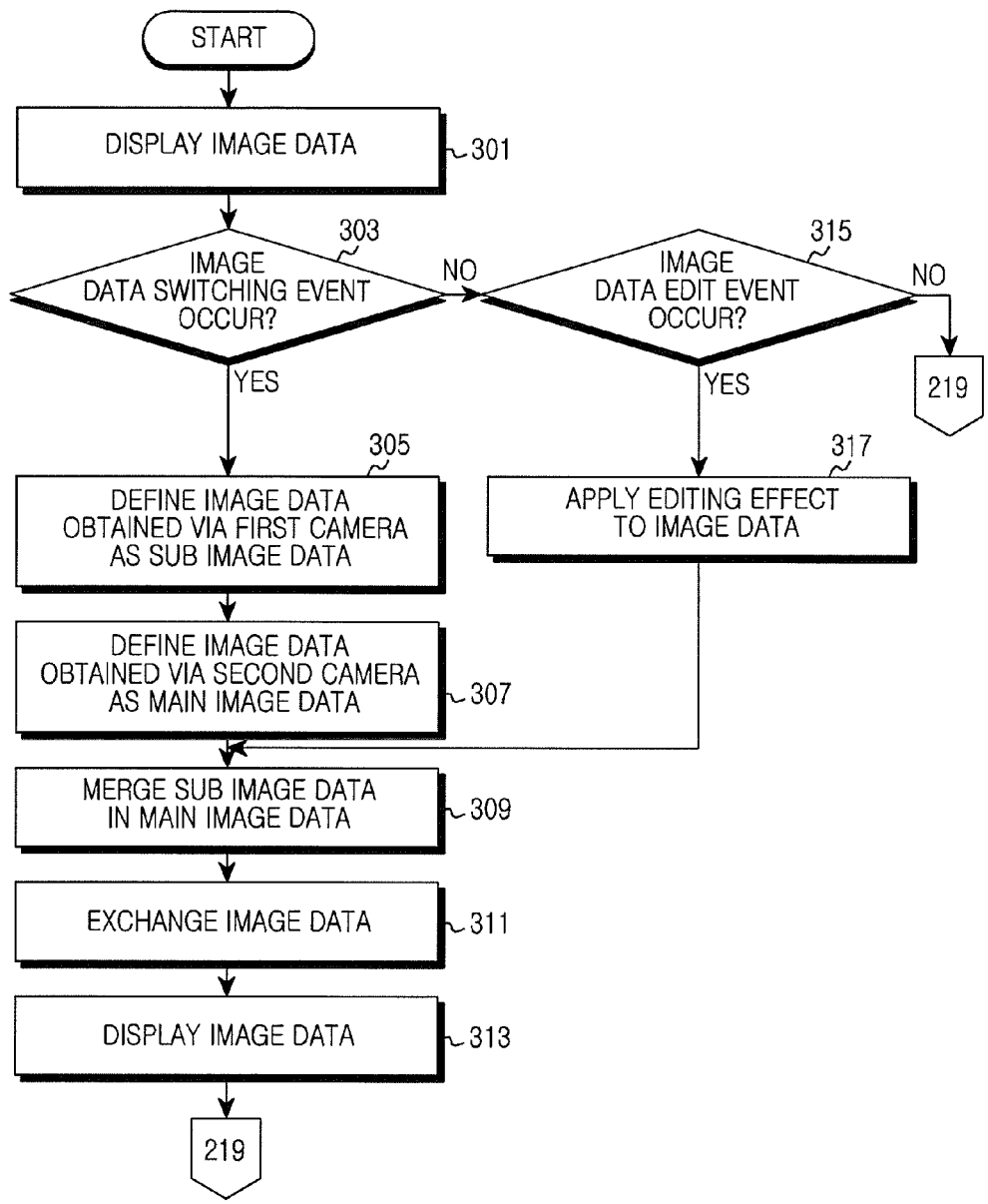
FIG. 3 illustrates a process of a process for controlling a video communication function in an electronic device according to the present disclosure.

FIG. 3 illustrates a process of a process for controlling a video communication function in an electronic device according to the present disclosure.

Referring to FIG. 3, controlling the video communication function may be switching main image data and sub image data, and editing displayed image data. Here, the editing the image data may be a process for controlling a size and a position of image data, and applying a specific effect to image data.

The electronic device for controlling a video communication function as described above may perform a process for displaying image data in block 301 first.

Here, the displaying of the image data may be block 217 of FIG. 2 for displaying main image data and sub image data on the first display region, and displaying image data received from the second electronic device on the second display region.

After that, the electronic device may proceed to block 303 to determine whether an image data switching event occurs. Here, the image data switching event denotes an event for changing main image data and sub image data displayed on the first display region. For example, positions and sizes of regions where the main image data and the sub image data are displayed will be different from each other. Due to the image data switching event, the positions and the sizes of the regions where the image data are displayed may change.

When determining the image data switching event occurs in block 303, the electronic device may proceed to block 305 to define image data obtained via the first camera as sub image data, and then proceed to block 307 to define image data obtained via the second camera as main image data.

The electronic device may proceed to block 309 to perform a process for merging sub image data in main image data.

According to an another embodiment, before the image data switching event occurs, the electronic device may define image data obtained via the first camera as main image data to display the same on the entire display region, and may define image data obtained via the second camera as sub image data to display the same on a portion of the region of the displayed image data.

The electronic device may define image data obtained via the second camera as main image data to display the same on the entire display region, and defines image data obtained via the first camera as sub image data to display the same on a portion of the region of the displayed image data.

After the block 309, the electronic device may proceed to block 311 to exchange image data with the second electronic device, and then proceed to block 313 to display image data, and then proceed to block 219 to determine whether the obtaining of image data is stopped.

In an embodiment, where the image data switching event does not occur in block 303, the electronic device may proceed to block 315 to determine whether an image data edit event occurs.

When determining the image data edit event does not occur in block 315, the electronic device may proceed to block 219 of FIG. 2 to determine whether the obtaining of image data is stopped.

When determining the image data edit event occurs in block 315, the electronic device may proceed to block 317 to apply an editing effect to image data.

Here, applying the editing effect to the image data may be applying text, an animation effect, and the like to the image data provided to the second electronic device.

The electronic device may proceed to block 309 to merge the editing effect-applied image data, and then proceed to block 311 to process to transmit the editing effect-applied image data to the second electronic device.

The electronic device may proceed to block 313 to display the editing effect-applied image data, and then proceed to block 219 of FIG. 2 to determine whether obtaining of image data is stopped.

FIGS. 4A, 4B and 4C illustrate views of a video communication process of an electronic device according to an example embodiment of the present disclosure.

Referring to FIGS. 4A, 4B and 4C, the electronic device may perform video communication using image data obtained via two cameras.

Here, image data obtained via the two cameras denote main image data obtained via a first camera and sub image data obtained via a second camera. In addition, the first camera and the second camera are disposed in different directions. For example, the first camera may be disposed in the front portion of the electronic device, and the second camera may be disposed in the rear portion of the electronic device.

Also, the electronic device may perform a video communication function allowing the main image data and the sub image data to be displayed simultaneously. Here, displaying the main image data and the sub image data simultaneously may be merging the sub image data in a portion of a display region of the main image data and displaying the same, and may be dividing the display region of the electronic device and displaying the main image data and the sub image data in respective divided regions.

When a video communication function is performed by a user, the electronic device may display a video communication screen including a region of displaying a video communication state, a region of displaying image data of a counterpart user, a region of displaying image data of the user himself, and a region of displaying a menu for controlling the video communication.

For example, as illustrated in FIG. 4A, the electronic device may display a video communication state 401 (a phone number and a communication time of a counterpart user) with Jeanette McHale who is a counterpart of the video communication, image data 403 of Jeanette McHale who is the counterpart of the video communication, image data 405 of the user himself, and a menu 407 for controlling the video communication. At this point, the position of a region where image data of the video communication counterpart and image data of the user himself are displayed may be changed depending on the user's selection.

In the illustrated drawing, as the menus for controlling the video communication, a menu (ex: PIP camera) for simultaneously displaying main image data and sub image data, a menu (ex: switch camera) for switching main image data, a menu (ex: mute) for controlling the volume of video communication, and a menu (end call) for ending video communication are displayed.

The menu for simultaneously displaying main image data and sub image data is a menu for allowing main image data obtained via the first camera and sub image data obtained via the second camera to be simultaneously displayed on a region displaying image data. For example, the menu allows image data obtained by shooting a user using the camera disposed in the front portion and image data obtained by shooting a background using the camera disposed in the rear portion to be displayed simultaneously.

The menu for switching the main image data is a menu for selecting image data to display on the region displaying image data, and is a menu for selecting an operation of the first camera or the second camera. For example, when the above menu is selected under a circumstance where image data that shoots a user using the camera disposed in the front portion is displayed on the region displaying image data, image data that shoots a background using the camera disposed in the rear portion may be displayed on the region displaying the image data.

As illustrated in FIG. 4B, when detecting the user's gesture 407 for selecting the menu for allowing the main image data and the sub image data to be displayed simultaneously among the displayed menu, the electronic device may merge image data obtained via the first camera and the second camera, and then process to display, in area 409, the merged image data as illustrated in FIG. 4C. The merged image data may be transferred to Jeanette McHale who is the counterpart of the video communication, such that the merged image data may be displayed on the screen of the electronic device of the counterpart user.

FIG. 4C illustrates a screen of merging sub image data that shoots a background in main image data that shoots a user in a PIP method.

FIGS. 5A, 5B, 5C and 5D illustrate views of a process for controlling video communication in an electronic device according to an example embodiment of the present disclosure.

Referring to FIGS. 5A, 5B, 5C and 5D, the electronic device may perform video communication using image data obtained via two cameras.

Here, image data obtained via the two cameras denote main image data obtained via the first camera and sub image data obtained via the second camera. In addition, the first camera and the second camera are disposed in different directions. For example, the first camera may be disposed in the front portion of the electronic device, and the second camera may be disposed in the rear portion of the electronic device.

The electronic device may perform a video communication function allowing the main image data and the sub image data to be displayed simultaneously. Here, displaying the main image data and the sub image data simultaneously may be merging the sub image data in a portion of a display region of the main image data and displaying the same, and may be dividing the display region of the electronic device and displaying the main image data and the sub image data in respective divided regions.

When a video communication function is performed by a user, the electronic device may display a video communication screen including a region of displaying a video communication state, a region of displaying image data of a counterpart user, a region of displaying image data of the user himself, and a region of displaying a menu for controlling the video communication.

For example, as illustrated in FIG. 5A, the electronic device may display a video communication state (a phone number and a communication time of a counterpart user) with Jeanette McHale who is a counterpart of the video communication, image data of Jeanette McHale who is the counterpart of the video communication, image data of the user himself, and a menu for controlling the video communication.

In the illustrated drawing, as image data of the user himself, image data that shoots the user of the electronic device is displayed in area 501. Generally, the electronic device disposes the cameras in the front portion and the rear portion, such that the electronic device of the illustrated drawing displays the user's face obtained via the camera in the front portion.

In an embodiment, where the menu (ex: switch camera) for switching main image data is selected by the user, the electronic device may process to switch displayed image data, in area 503, as illustrated in FIG. 5B.

Here, switching the image data denotes switching an operation of a camera, and stopping an operation of the camera disposed in the front portion and operating the camera disposed in the rear portion.

According to an embodiment, as illustrated in FIG. 5B, the electronic device may process to display, in area 503, a background obtained via the camera disposed in the rear portion.

In an embodiment, where the menu for allowing main image data and sub image data to be simultaneously displayed is selected by the user, the electronic device may process to allow image data obtained via the cameras disposed in the front portion and the rear portion to be simultaneously displayed as illustrated in FIGS. 5C and 5D.

FIG. 5D illustrates a situation where a menu for allowing main image data and sub image data to be simultaneously displayed is selected with a user's face displayed as illustrated in FIG. 5A.

FIG. 5A illustrates a situation where image data obtained via the camera disposed in the front portion is displayed as main image data. When the above menu is selected under this situation, the electronic device may operate the camera disposed in the rear portion to obtain sub image data.

After that, as illustrated in FIG. 5D, the electronic device may merge sub image data in a portion of a region of main image data and process to allow the user's face and a background to be simultaneously displayed in area 507.

FIG. 5C illustrates a situation where a menu for allowing main image data and sub image data to be simultaneously displayed is selected with a background displayed as illustrated in FIG. 5B.

FIG. 5B illustrates a situation where image data obtained via the camera disposed in the rear portion is displayed as main image data. When the above menu is selected under this situation, the electronic device may operate the camera disposed in the front portion to obtain sub image data.

As illustrated in FIG. 5C, the electronic device may merge sub image data in a portion of main image data and process to allow the user's face and the background to be displayed, in area 505, simultaneously.

When a menu for switching main image data is selected with the main image data and sub image data displayed simultaneously, the electronic device may process to switch the main image data and the sub image data such that the sub image data is displayed as main image data.

This may be a situation where the electronic device that has detected menu selection displays the screen displayed in FIG. 5C as illustrated in FIG. 5D.

Figure 6A:
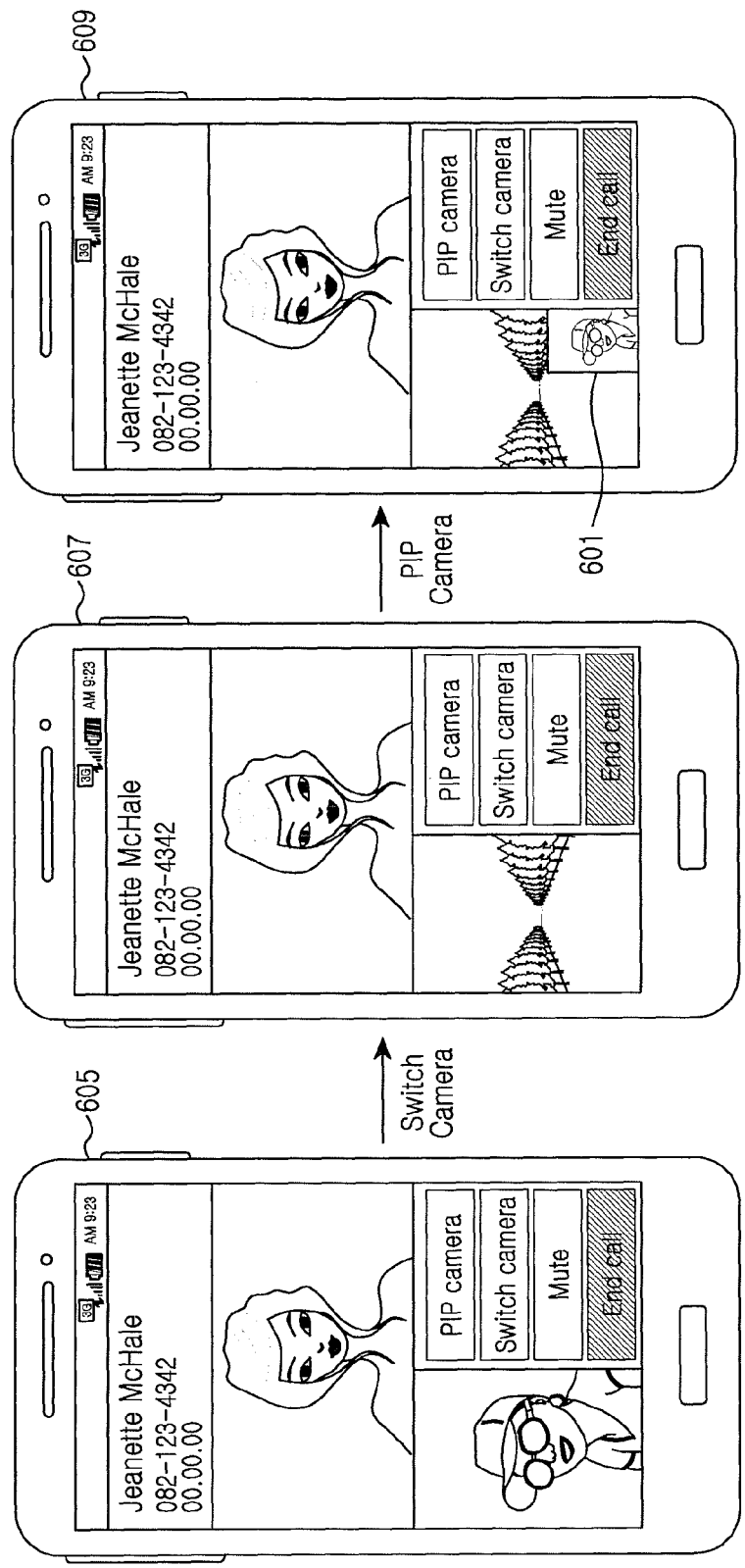
FIGS. 6A and 6B illustrate views of a screen of an electronic device performing a video communication function according to the present disclosure.
Figure 6B:
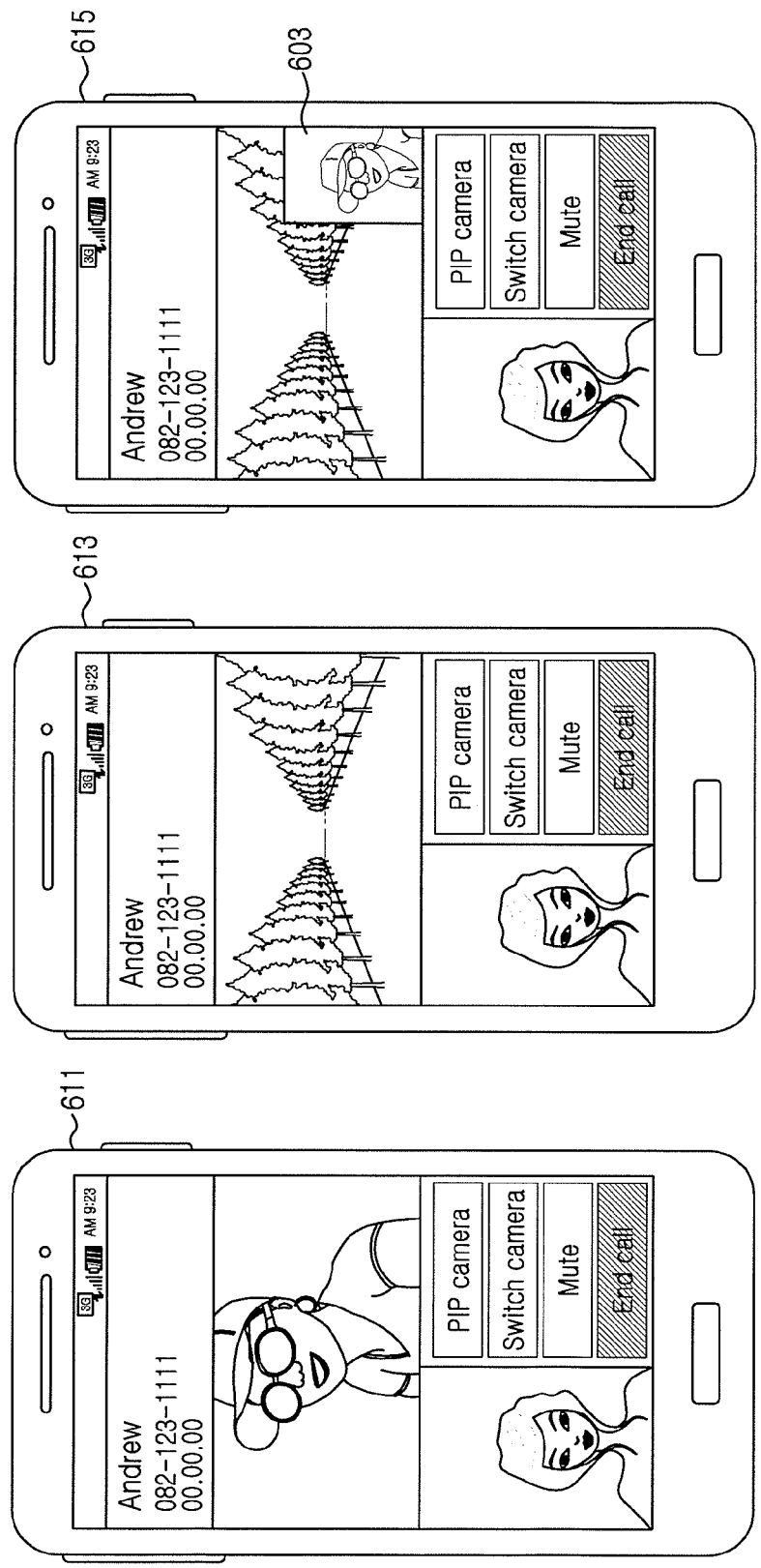

FIGS. 6A and 6B illustrate views of a screen of an electronic device performing a video communication function according to the present disclosure.

Referring to FIGS. 6A and 6B, the electronic device may provide a video communication function of displaying main image data and sub image data simultaneously.

A first electronic device and a second electronic device of the illustrated drawing perform video communication with each other.

The first electronic device denotes an electronic device of a user "Andrew" who performs video communication with "Jeanette McHale", and the second electronic device denotes an electronic device of "Jeanette McHale" who performs video communication with "Andrew". This may be determined via a video communication state (a phone number and a communication time of a counterpart user).

According to an embodiment, the first electronic device and the second electronic device display image data of a counterpart user on a large screen, and display image data of itself on a small screen. This is a mere embodiment of the present disclosure, and image data may be displayed in various methods.

As illustrated in electronic device 605, where the first electronic device uses main image data obtained via the first camera for video communication, the main image data of the first electronic device may be displayed also on the screen of the second electronic device as illustrated in electronic device 611.

In an embodiment, where the first electronic device switches image data as illustrated in electronic device 607 (when obtaining image data regarding a background), image data obtained via the second camera may be defined as main image data.

As illustrated in electronic device 613, switched image data (image data regarding a background) may be displayed also on the screen of the second electronic device.

In an embodiment, where the first electronic device uses main image data and sub image data for video communication as illustrated in electronic device 609, the first electronic device may define image data obtained via the first camera as sub image data, and process to merge the main image data with the sub image data, and process and display, in area 601, the same.

Accordingly, as illustrated in electronic device 615, the image data where the main image data and the sub image data have merged may be displayed, in area 603, also on the screen of the second electronic device.

Figures 7A, 7B:
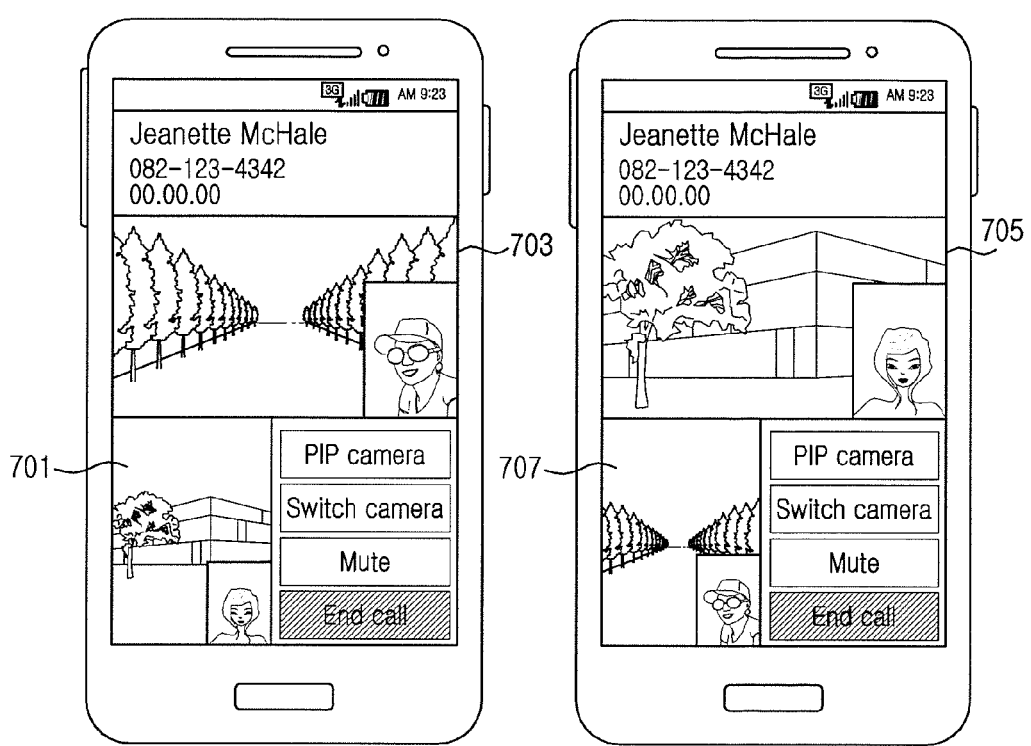
FIGS. 7A and 7B illustrate views of a screen of video communication of an electronic device according to an example embodiment of the present disclosure.

FIGS. 7A and 7B illustrate views of a screen of video communication of an electronic device according to an example embodiment of the present disclosure.

Referring to FIGS. 7A and 7B, the electronic device provides a video communication function for simultaneously displaying main image data and sub image data.

The first electronic device and the second electronic device of the illustrated drawing may perform video communication.

The first electronic device denotes an electronic device of "Jeanette McHale" who performs video communication with "Andrew", and the second electronic device denotes an electronic device of the user "Andrew" who performs video communication with "Jeanette McHale".

According to an embodiment, the first electronic device and the second electronic device may display image data of a counterpart user on a large screen, and display image data of itself on a small screen. This is a mere embodiment of the present disclosure, and image data may be displayed in various methods.

As illustrated, the first electronic device and the second electronic device may perform a video communication function for simultaneously displaying main image data and sub image data.

According to an embodiment, the first electronic device and the second electronic device may simultaneously display main image data and sub image data depending on a user's selection.

When a function for simultaneously displaying main image data and sub image data depending on a user's selection is performed also in an electronic device performing video communication with the user, the electronic device may simultaneously display obtained main image data and sub image data, and may also simultaneously display main image data and sub image data obtained by an electronic device of a counterpart user.

FIG. 7A illustrates a view of a screen of an electronic device of the user "Jeanette McHale", and illustrates a situation where the electronic device simultaneously displays, in area 701, obtained main image data (background) and sub image data (user's face) on a small screen, and receives main image data (background) and sub image data (user's face) obtained by an electronic device of the user "Andrew" and simultaneously displays, in area 703, the same on a large screen.

FIG. 7B illustrates a view of the screen of the electronic device of the user "Andrew", and illustrates a situation where the electronic device simultaneously displays, in area 707, obtained main image data (background) and sub image data (user's face) on a small screen, and receives main image data (background) and sub image data (user's face) obtained by an electronic device of the user "Jeanette McHale" and simultaneously displays, in area 705, the same on a large screen.

FIG. 8 illustrates a view of a screen of video communication of an electronic device according to another example embodiment of the present disclosure.

Referring to FIGS. 8A, 8B, 8C and 8D, the electronic device may provide a video communication function for displaying together main image data and sub image data.

FIGS. 8A, 8B, 8C and 8D illustrate situations of dividing a display region of the electronic device and displaying image data of himself and image data of a video communication counterpart on divided regions.

The illustrated electronic device may perform video communication using image data obtained via one camera.

According to an embodiment, the electronic device exchanges image data obtained via the camera disposed in the front side with a video communication counterpart to perform video communication.

The electronic device may perform a video communication function using main image data and sub image data according to the present disclosure.

Figure 8A:
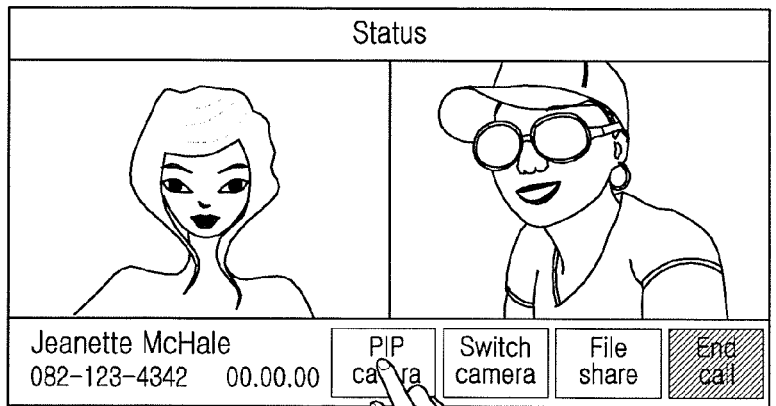
FIGS. 8A, 8B and 8C illustrate views of a screen of video communication of an electronic device according to another example embodiment of the present disclosure.
Figure 8B:
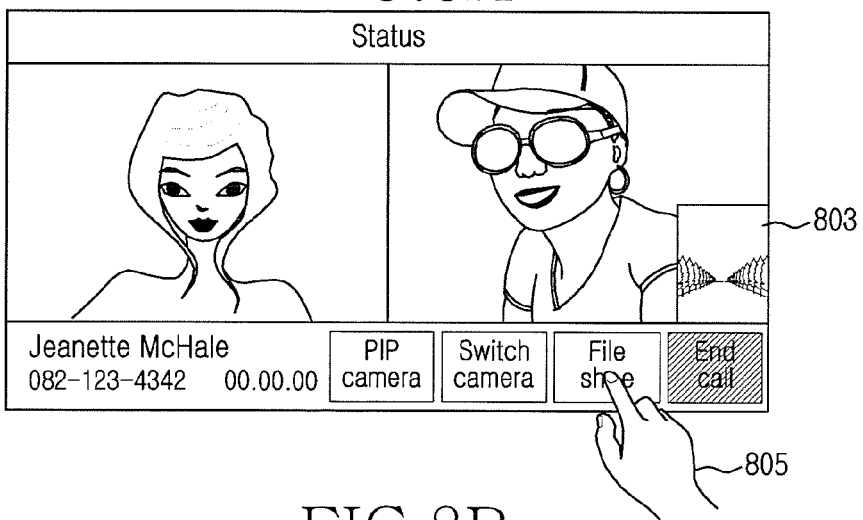

According to an embodiment, when detecting selection of a menu for allowing main image data and sub image data to be simultaneously displayed as illustrated in FIG. 8A, the electronic device may also display, in area 803, image data obtained via the camera disposed in the rear side together as illustrated in FIG. 8B.

In the illustrated drawing, left image data denotes image data of a counterpart, and right image data denotes image data of the electronic device.

Here, image data of the electronic device displayed on the right shows that image data that has shot a user via the camera disposed in the front side and image data that has shot a background via the camera disposed in the rear side are simultaneously displayed.

In addition, the electronic device may provide a function for transmitting data to a video communication counterpart while performing video communication.

Here, the function for transmitting the data denotes a function for providing data obtained via the electronic device and data stored in advance to a video communication counterpart. The electronic device may perform the above function by selecting a file share menu illustrated in FIG. 8B.

According to an embodiment, when detecting the menu for starting a data transmission function is selected by user's gesture 805 as illustrated in FIG. 8B, the electronic device may display a list of transmittable data and then determine data which a user desires to transmit and process to transmit the same to a counterpart user though not shown.

At this point, the electronic device may display a data transmission state on a region where main image data or sub image data is displayed according to the present disclosure.

Figure 8C:
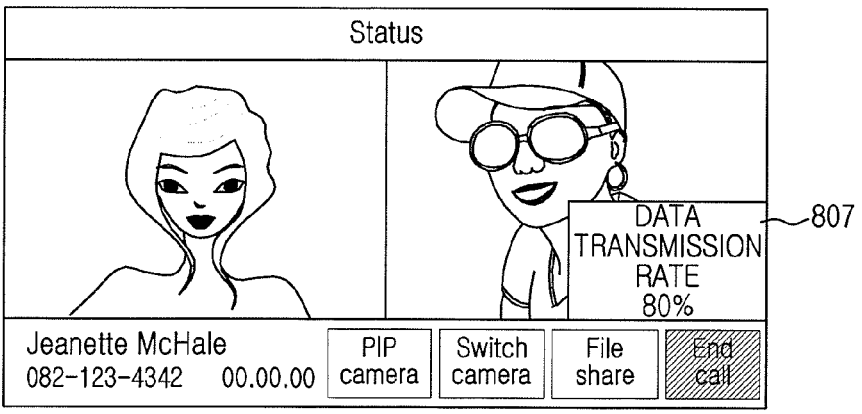

This is illustrated in FIG. 8C. FIG. 8C illustrates a situation displaying a data transmission state 807 in the form of percentage information on the region where sub image data is displayed. At this point, the electronic device may display a data transmission state using a state bar, a graph, and the like besides percentage information.

In addition, the electronic device may display a thumbnail of transmitted data on the region where sub image data is displayed.

Figure 9A:
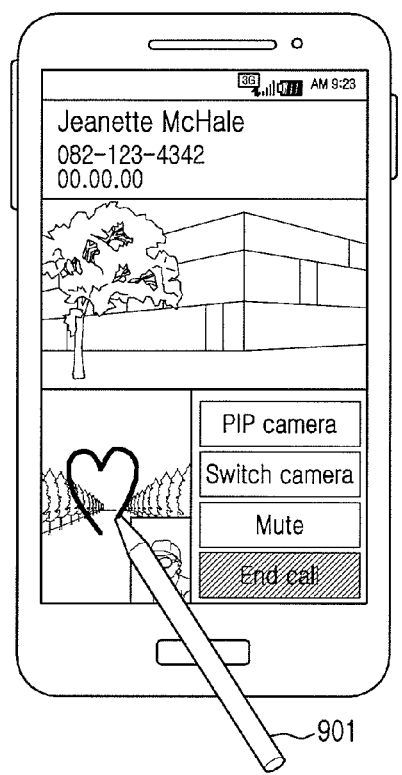
FIGS. 9A and 9B illustrate views of a screen of video communication of an electronic device according to still another example embodiment of the present disclosure.
Figure 9B:
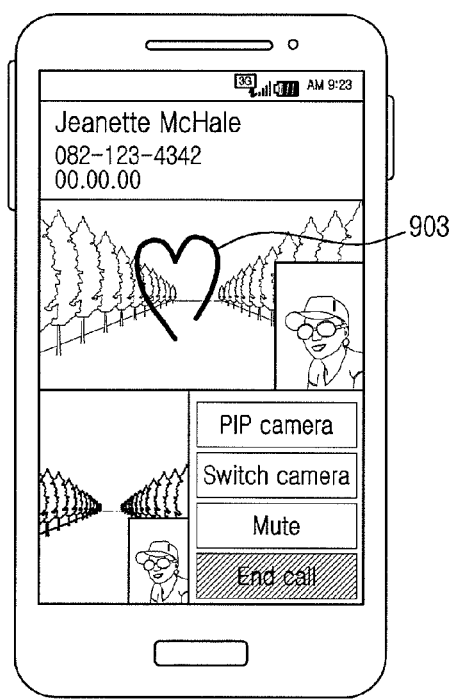

FIGS. 9A and 9B illustrate views of a screen of video communication of an electronic device according to still another example embodiment of the present disclosure.

Referring to FIGS. 9A and 9B, the electronic device may provide a function for editing image data during video communication.

Here, editing image data may be controlling the size, the position of displayed image data, and a process of applying a specific effect to image data.

Controlling the size and the position of the displayed image data denotes changing the display region of sub image data merged in main image data. The electronic device may detect a user's gesture to enlarge/reduce the display region of the sub image data or change the position of the sub image data and process to display the image data on the changed display region.

According to the present disclosure, the electronic device may apply a specific effect to image data and process to transmit the same to a counterpart user.

According to an embodiment, as illustrated in FIG. 9A, where a user of the electronic device generates an animation effect (add a heart figure to image data) 901 to image data using a tool for generating input data, the electronic device applies an animation effect to image data and transmits the same to a counterpart user.

Accordingly, an electronic device of the counterpart user may display, in area 903, the image data to which the animation effect has been applied as illustrated in FIG. 9B.

The technology described in FIGS. 9A and 9B may be used for transferring a message where a user points in person a specific point of an image transmitted to a counterpart user and desires to transfer the same together with description to the counterpart user.

As described above, since an electronic device according to the present disclosure may omit a process for allowing a user to switch a camera by simultaneously using main image data and sub image data during video communication in an electronic device.

In addition, the electronic device may edit image data transmitted to a counterpart user to enable message transfer for the image data.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain example embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method in an electronic device, the method comprising:
   obtaining first image data using a first camera;
   obtaining second image data using a second camera;
   merging the first image data with the second image data; and
   transmitting the merged image data to a second electronic device;
   displaying the first image data with the second image data, wherein, based on a user input, a position of a region where the first image data is displayed is swapped for a position of a region where the second image data is displayed.

2. The method of claim 1, wherein merging the first image data with the second image data comprises:
   defining the first image data and the second image data as main image data and sub image data;
   determining a region where the sub image data is displayed on a portion of a display region of the main image data; and
   merging the sub image data in the determined region.

3. The method of claim 1, wherein merging the first image data with the second image data comprises:
   applying an editing effect corresponding to a user's gesture to at least one of the first image data and the second image data.

4. The method of claim 3, wherein the editing effect comprises at least one of size control, position change of a region where the sub image data is displayed, addition of text, and application of an animation effect to the image data.

5. The method of claim 1, wherein merging the first image data with the second image data comprises:

when a data transmission event occurs during video communication, adding information of transmitted data to one of the first image data and the second image data.

6. The method of claim 1, further comprising:
receiving image data where first image data and second image data have merged from the second electronic device and displaying the same.

7. The method of claim 2, further comprising:
swapping the main image data and the sub image data.

8. An electronic device comprising:
a display and at least one processor,
wherein the processor is configured to obtain first image data using a first camera, obtain second image data using a second camera, merges the first image data with the second image data, transmit the merged image data to a second electronic device, and control the display to the display the first image data with the second image data,
wherein, based on a user input, a position of a region where the first image data is displayed is swapped for a position of a region where the second image data is displayed.

9. The electronic device of claim 8, wherein the processor defines the first image data and the second image data as main image data and sub image data, determines a region where the sub image data is displayed on a portion of a display region of the main image data, and processes to merge the sub image data in the determined region.

10. The electronic device of claim 8, wherein the processor processes to apply an editing effect corresponding to a user's gesture to at least one of the first image data and the second image data.

11. The electronic device of claim 10, wherein the processor processes to apply at least one of editing effects comprising size control, position change of a region where the sub image data is displayed, addition of text, and application of an animation effect to the image data.

12. The electronic device of claim 8, wherein when a data transmission event occurs during video communication, the processor processes to add information of transmitted data to at least one of the first image data and the second image data.

13. The electronic device of claim 8, wherein the processor processes to receive image data where first image data and second image data have merged from the second electronic device and display the same.

14. A non-transitory computer readable storage medium storing a program that, when executed by an electronic device, causes the electronic device to:
obtain first image data using a first camera,
obtain second image data using a second camera,
merge the first image data with the second image data,
transmit the merged image data to a second electronic device,
display the first image data with the second image data, and
swap, based on a user input, a position of a region where the first image is displayed for a position of a region where the second image is displayed.

15. An apparatus, comprising:
a first camera configured to obtain first image data;
a second camera configured to obtain second image data;
a processor configured to merge the first image data with the second image data;
a communication system configured to transmit the merged image data to a second electronic device; and
a display configured to display the first image data with the second image data,
wherein, based on a user input, a position of a region where the first image is displayed is swapped for a position of a region where the second image is displayed.

16. The apparatus of claim 15, wherein merging the first image data with the second image data comprises the processor configured to:
define the first image data and the second image data as main image data and sub image data;
determine a region where the sub image data is displayed on a portion of a display region of the main image data; and
merge the sub image data in the determined region.

17. The apparatus of claim 15, wherein merging the first image data with the second image data comprises the processor configured to:
apply an editing effect corresponding to a user's gesture to at least one of the first image data and the second image data.

18. The apparatus of claim 17, wherein the editing effect comprises at least one of size control, position change of a region where the sub image data is displayed, addition of text, and application of an animation effect to the image data.

19. The apparatus of claim 15, wherein merging the first image data with the second image data comprises the processor configured to:
when a data transmission event occurs during video communication, add information of transmitted data to one of the first image data and the second image data.

20. The apparatus of claim 15, further comprising:
the communication system configured to receive image data where first image data and second image data have merged from the second electronic device and displaying the same.

* * * * *